(12) United States Patent
Lin et al.

(10) Patent No.: US 10,983,892 B2
(45) Date of Patent: Apr. 20, 2021

(54) METHOD AND SYSTEM FOR ESTIMATING EFFICIENCY OF MACHINE VISION

(71) Applicant: Acer Incorporated, New Taipei (TW)

(72) Inventors: Yun-Ting Lin, New Taipei (TW);
Yen-Ju Hsiao, New Taipei (TW);
Shu-Cheng Liu, New Taipei (TW);
Cheng-Yi Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 193 days.

(21) Appl. No.: 16/231,419

(22) Filed: Dec. 22, 2018

(65) Prior Publication Data
US 2020/0097383 A1    Mar. 26, 2020

(30) Foreign Application Priority Data
Sep. 26, 2018  (TW) .................................. 107133907

(51) Int. Cl.
*G06F 11/34* (2006.01)
*G06T 1/00* (2006.01)

(52) U.S. Cl.
CPC ...... *G06F 11/3466* (2013.01); *G06F 11/3419* (2013.01); *G06T 1/0014* (2013.01)

(58) Field of Classification Search
CPC .. G06F 11/3419; G06F 11/3466; G06F 16/00; G06F 16/686; G06F 16/955; G06F 16/9558; G06F 3/0482; G06F 40/134; G06K 9/6267; G06T 1/0014; G10L 25/51
See application file for complete search history.

(56) References Cited

U.S. PATENT DOCUMENTS

| | | | |
|---|---|---|---|
| 10,289,932 B2 * | 5/2019 | Barnett | G06K 9/6202 |
| 10,592,774 B2 * | 3/2020 | Bremer | G06K 9/6215 |
| 10,740,694 B2 * | 8/2020 | Harvill | G06N 5/04 |
| 2020/0143146 A1 * | 5/2020 | Li | G06K 9/6232 |

\* cited by examiner

*Primary Examiner* — Bobbak Safaipour
(74) *Attorney, Agent, or Firm* — JCIPRNET (57) ABSTRACT

Embodiments of the present disclosure provide a method for evaluating (e.g., estimating) an efficiency of a machine vision, which includes: obtaining an image, wherein the image presents a plurality of objects which include a first object and a second object; performing an image recognition on the images by the machine vision to obtain a prediction block corresponding to at least one of the first object and the second object; merging a first standard block corresponding to the first object and a second standard block corresponding to the second object to obtain a third standard block; and obtaining evaluation information according to the third standard block and the prediction block, wherein the evaluation information reflects a prediction efficiency of the machine vision for the objects in the image.

16 Claims, 4 Drawing Sheets

| Prediction order | First type parameter | Second type parameter |
|---|---|---|
| 0 | 0 | 0 |
| 1 | 1/1 | 2/6 |
| 2 | 2/2 | 3/6 |
| 3 | 2/3 | 3/6 |
| 4 | 3/4 | 5/6 |

Accuracy=0.75

Variation of the second type parameter: 2/6, 1/6, 0, 2/6

FIG. 7

- S801 Obtaining an image
- S802 Performing an image recognition on the image by a machine vision to obtain a prediction block corresponding to at least one of a first object and a second object
- S803 Merging a first standard block corresponding to the first object and a second standard block corresponding to the second object to obtain a third standard block
- S804 Obtaining evaluation information according to the third standard block and the prediction block

FIG. 8

METHOD AND SYSTEM FOR ESTIMATING EFFICIENCY OF MACHINE VISION

CROSS-REFERENCE TO RELATED APPLICATION

This application claims the priority benefit of Taiwan application serial no. 107133907, filed on Sep. 26, 2018. The entirety of the above-mentioned patent application is hereby incorporated by reference herein and made a part of this specification.

BACKGROUND

Technical Field

The disclosure relates to an image recognition technology, and in particular to a method and a system for evaluating efficiency of a machine vision.

Description of Related Art

Image Identification technology has evolved more and more mature, but there are still insufficient mechanisms for evaluating the effectiveness of a machine vision. For example, when encountering multiple objects that are grouped together in one image, the machine vision may select such objects by a large range. However, in the earliest evaluation mechanism, the evaluation mechanism may consider the machine vision to be ineffective because it does not mark each object one by one. In addition, according to the specification of OpenImage proposed by Google, although multiple objects grouped together can be considered to be successfully identified in one-time identification, it still cannot be specifically distinguish how many objects therein are successfully identified and then scored accordingly.

SUMMARY

The disclosure provides a method and system for evaluating an efficiency of a machine vision, which may improve the above problems.

Embodiments of the present disclosure provide a method for evaluating an efficiency of a machine vision, which includes: obtaining an image, wherein the image presents a plurality of objects which include a first object and a second object; performing an image recognition on the images by the machine vision to obtain a prediction block corresponding to at least one of the first object and the second object; merging a first standard block corresponding to the first object and a second standard block corresponding to the second object to obtain a third standard block; and obtaining evaluation information according to the third standard block and the prediction block, wherein the evaluation information reflects a prediction efficiency of the machine vision for the objects in the image.

Embodiments of the present disclosure further provides a system for evaluating an efficiency of a machine vision, which includes a storage device, an image recognize module, and a processor. The storage device stores an image, wherein the image presents a plurality of objects which include a first object and a second object. The processor is coupled to the storage device and the image recognize module. The image recognize module performs an image recognition on the image by the machine vision to obtain a prediction block corresponding to at least one of the first object and the second object. The processor merges a first standard block corresponding to the first object and a second standard block corresponding to the second object to obtain a third standard block, and the processor obtains evaluation information according to the third standard block and the prediction block, wherein the evaluation information reflects a prediction efficiency of the machine vision for the objects in the image.

Based on the above, after obtaining the image including the first object and the second object, the image recognition may be performed on the image by the machine vision to obtain a prediction block corresponding to at least one of the first object and the second object. Then, a first standard block corresponding to the first object and a second standard block corresponding to the second object may be merged (e.g., combined) to obtain a third standard block. According to the third standard block and the prediction block, the evaluation information may be obtained. The evaluation information reflects the prediction efficiency of the machine vision for the objects in the image. Thereby, the defect that the traditional recognition of machine vision for multiple grouping objects cannot be effectively scored may be effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
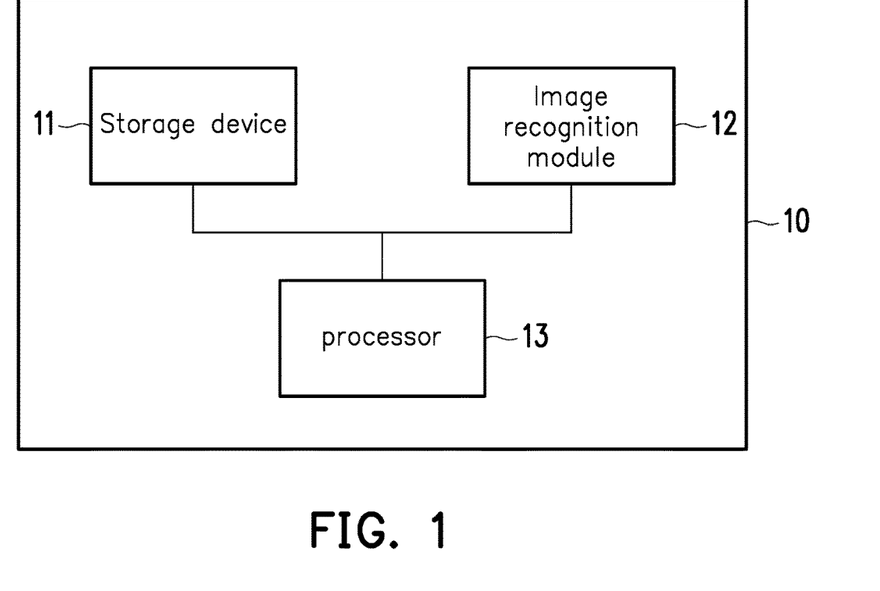
FIG. 1 is a schematic diagram of a system for evaluating an efficiency of a machine vision according to an embodiment of the disclosure.

FIG. 1 is a schematic diagram of a system for evaluating (or estimating) an efficiency of a machine vision according to an embodiment of the disclosure. Referring to FIG. 1, a system (also referred to as a machine vision efficiency evaluation system) 10 includes a storage device 11, an image recognize module 12, and a processor 13. In an embodiment, the system 10 may be implemented as an electronic device which supports image processing and computing functions, such as a smart phone, a tablet computer, a notebook computer, a desktop computer, or an industrial computer. In an embodiment, the system 10 may include a plurality of electronic devices that are independent of each other, and these electronic devices may be connected to each other by wire or wirelessly. For example, in an embodiment, the storage device 11 and the image recognize module 12 may be implemented in a local device, and the processor 13 may be implemented in a remote server. The local device and the remote server may be connected via Internet or a local area network.

The storage device 11 is configured to store one or more images and other data. For example, the storage device 11 may include a volatile storage medium and a non-volatile storage medium. The volatile storage medium may be a random access memory (RAM), and the non-volatile storage medium may be a read only memory (ROM), a solid state disk (SSD) or a hard disk drive (HDD).

The image recognize module 12 is configured to perform an image recognition on an image stored in the storage device 11 by a machine vision, so as to identify a target object in the image. The image recognize module 12 can be implemented as a software module, a firmware module or a hardware circuit. For example, in an embodiment, the image recognize module 12 may include at least one graphic processing unit (GPU) or similar processing chip to perform the image recognition of the machine vision. Alternatively, in an embodiment, the image recognize module 12 may be program codes that can be loaded into the storage device 11 and be executed by the processor 13. In addition, the image recognize module 12 may have an artificial intelligence architecture such as machine learning and/or deep learning and may be trained to continuously improve its image recognition performance.

The processor 13 is coupled to the storage device 11 and the image recognize module 12. The processor 13 may be a central processing unit (CPU), or other programmable general purpose or special purpose microprocessor, digital signal processor (DSP), programmable controller, special application specific integrated circuits (ASICs), programmable logic devices (PLDs), or other similar devices or a combination of these devices.

A specific image (also referred to as a target image) stored by the storage device 11 presents a plurality of objects (also referred to as the target objects). The target objects at least include a first object and a second object. It should be noted that, a shortest distance gap between the first object and the second object in the target image is less than a distance threshold value. In an embodiment, in response to the shortest distance gap between the first object and the second object in the target image being less than the distance threshold value, the processor 13 may determine that the first object and the second object belong to grouping objects. In addition, if the shortest distance gap between the first object and the second object in the target image is not less than the distance threshold value, the processor 13 may determine that the first object and the second object are not belonging to the grouping objects.

The image recognize module 12 may perform an image recognition on the target image by the machine vision to obtain at least one prediction block corresponding to at least one of the first object and the second object. For example, the first object, the second object, and the prediction block may cover an image range (also referred to as a pixel range) in the target image, respectively. The position and the covered image range of the prediction block in the target image reflect that the image recognize module 12 determines that there are one or more target objects to be searched in this image range by automatic image recognition of machine vision. The processor 13 may analyze the target image and the recognition result of the image recognize module 12 and then generate evaluation information. The evaluation information may reflect a prediction efficiency (i.e., a prediction performance) of the machine vision of the image recognize module 12 for predicting (i.e., searching) the target objects in the target image.

Specifically, the processor 13 may determine, in the target image, a standard block (also referred to as a first standard block) corresponding to the first object and a standard block (also referred to as a second standard block) corresponding to the second object. The first standard block reflects an actual position of the first object and a covered image range of the first object in the target image. The second standard block reflects an actual position of the second object and a covered image range of the second object in the target image. For example, the processor 13 may automatically determine a position and the covered range of a specific standard block according to setting information corresponding to the target image. Alternatively, the processor 13 may determine the position and the covered range of the specific standard block based on a user operation.

The processor 13 may merge (i.e., combine) the first standard block corresponding to the first object and the second standard block corresponding to the second object to obtain another standard block (also referred to as a third standard block). The third standard block covers at least a portion of the image range of the first standard block and at least a portion of the image range of the second standard block. Then, the processor 13 may obtain the evaluation information according to the third standard block and the prediction block.

Figure 2:
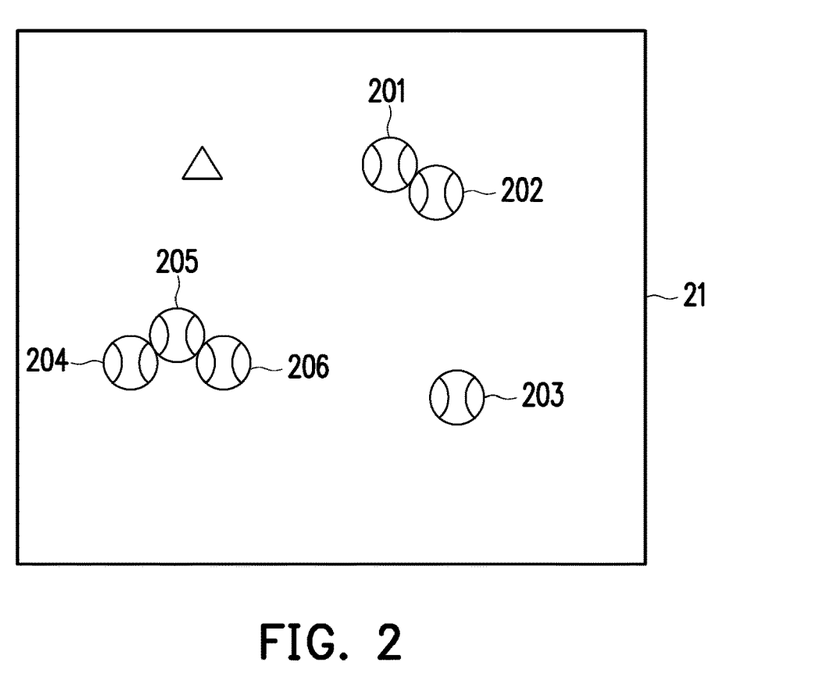
FIG. 2 is a schematic diagram of a target image according to an embodiment of the disclosure.

FIG. 2 is a schematic diagram of a target image according to an embodiment of the disclosure. Referring to FIG. 2, an image 21 is an example of a target image. The image 21 includes objects 201-206. Each of the objects 201-206 is a target object to be searched for. In the present embodiment, the target object is a baseball pattern as an example. However, in another implementation, the target object may also be other types of object patterns, which are not limited in the present disclosure. For example, in an embodiment, the image 21 may be an internal image of a human taken by an endoscope, and the objects 201-206 may be patterns of stones (e.g., gallstones or kidney stones).

It should be noted that, a shortest distance gap between the objects 201 and 202 in the image 21, a shortest distance gap between the objects 204 and 205 in the image 21, and a shortest distance gap between the objects 205 and 206 in the image 21 are all shorter than the distance threshold value. Therefore, the objects 201 and 202 belong to the grouping objects, and the objects 204-206 also belong to the grouping objects. In addition, a shortest distance gap between the object 203 and other objects is greater than the distance threshold value, so that the object 203 does not belong to the grouping objects. In another embodiment, the image 21 may not include an object (e.g., the object 203) that does not belong to the grouping objects, and the disclosure is not limited thereto.

Figure 3:
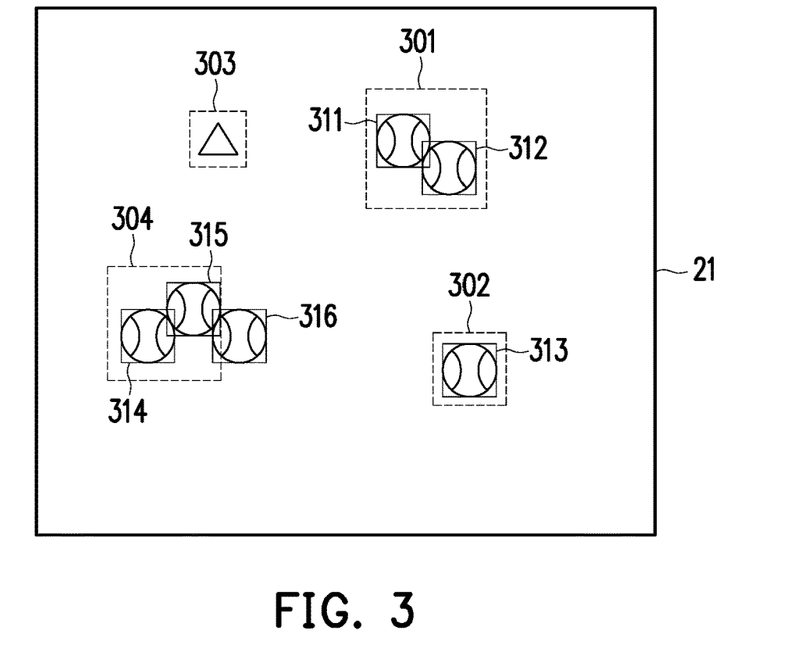
FIG. 3 is a schematic diagram of a standard block and a prediction block according to an embodiment of the disclosure.

FIG. 3 is a schematic diagram of a standard block and a prediction block according to an embodiment of the disclosure. Referring to FIG. 1 to FIG. 3, standard blocks 311-316 are respectively determined and generated corresponding to the objects 201-206. In addition, after the image recognition of machine vision, the prediction blocks 301-304 may be determined and generated in sequence (e.g., one by one). For example, the prediction block 301 may be generated corresponding to at least one of the objects 201 and 202, the prediction block 302 may be generated corresponding to the object 203, the prediction block 303 may be generated corresponding to a noise pattern in the image 21 (indicating a prediction error), and the prediction block 304 may be generated corresponding to at least one of the objects 204-206. That is, the image recognize module 12 may consider that at least one target object is included in the image range covered by the prediction blocks 301-304, respectively.

In an embodiment, the prediction blocks 301-304 are generated sequentially, and a generation order of the prediction blocks 301-304 reflects the confidence of the image recognize module 12 for the image recognition result. For example, the prediction block 301 is generated first, indicating that the image recognize module 12 considers that the prediction block 301 is the most likely to contain at least one target object; however, the prediction block 304 is finally generated, indicating that the image recognize module 12 considers that the possibility that the prediction block 304 contains at least one target object is lower than the possibility that the other prediction blocks 301-303 contain the target object.

In an embodiment, the processor 13 may determine whether the standard blocks 311 and 312 corresponding to the grouping objects belong to a target group (also referred to as a first target group) corresponding to the prediction block 301. For example, the processor 13 may determine whether the standard block 311 belongs to the first target group according to an overlapping state between the standard block 311 and the prediction block 301. In addition, the processor 13 may determine whether the standard block 312 belongs to the first target group according to an overlapping state between the standard block 312 and the prediction block 301.

In an embodiment, the processor 13 may obtain an image range covered by the standard block 311 and an image range covered by the prediction block 301. The processor 13 may obtain an overlapping state between the standard block 311 and the prediction block 301 according to the image range covered by the standard block 311 and the image range covered by the prediction block 301. The overlapping state reflects an overlapping degree between the image range covered by the standard block 311 and the image range covered by the prediction block 301.

In an embodiment, the processor 13 may obtain an overlapping area (also referred to as a first area) between the image range covered by the standard block 311 and the image range covered by the prediction block 301. In an embodiment, the overlapping area between an image range and another image range is also referred to as an intersection set area. In addition, the processor 13 may obtain an area (also referred to as a second area) of the image range covered by the standard block 311. The processor 13 may divide the first area by the second area to obtain a value (also referred to as a first value). The processor 13 may determine whether the first value is greater than a preset value (also referred to as a first preset value). If the first value is greater than the first preset value, the processor 13 may determine that the standard block 311 belongs to the first target group. However, if the first value is not greater than the first preset value, the processor 13 may determine that the standard block 311 does not belong to the first target group. In this embodiment, the first value is greater than the first preset value, so the processor 13 may determine that the standard block 311 belongs to the first target group corresponding to the prediction block 301. Based on a similar manner, the processor 13 may determine that the standard block 312 also belongs to the first target group corresponding to the prediction block 301 and determine that the standard blocks 314 and 315 both belong to a target group (also referred to as a second target group) corresponding to the prediction block 304.

It should be noted that, in an embodiment, the processor 13 may determine that the standard block 316 does not belong to the second target group according to an overlapping state between the standard block 316 and the prediction block 304. For example, according to the overlapping state between the standard block 316 and the prediction block 304, the processor 13 may obtain an overlapping area (also referred to as a third area) between an image range covered by the standard block 316 and an image range covered by the prediction block 304. In addition, the processor 13 may obtain an area (also referred to as a fourth area) of the image range covered by the standard block 316. The processor 13 may divide the third area by the fourth area to obtain a value (also referred to as a second value). In this embodiment, the second value is not greater than the first preset value, so the processor 13 may determine that the standard block 316 does not belong to the second target group corresponding to the prediction block 304.

Figure 4:
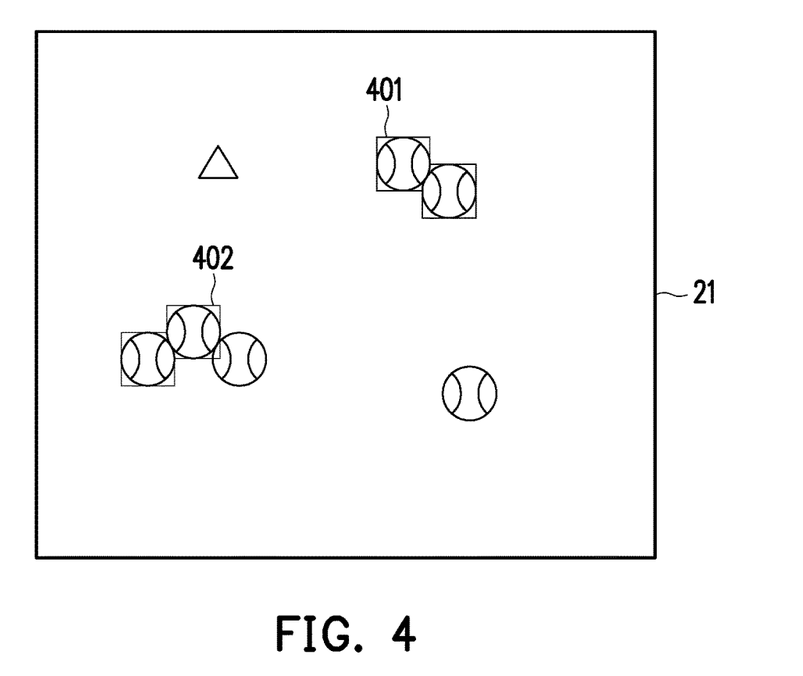
FIG. 4 is a schematic diagram of merging standard blocks according to an embodiment of the disclosure.

FIG. 4 is a schematic diagram of merging standard blocks according to an embodiment of the disclosure. Referring to FIG. 1 to FIG. 4, in response to the standard blocks 311 and 312 both belonging to the first target group corresponding to the prediction block 301, the processor 13 may merge the standard blocks 311 and 312 into one standard block 401. Furthermore, in response to the standard blocks 314 and 315 both belonging to the second target group corresponding to the prediction block 304, the processor 13 may merge the standard blocks 314 and 315 into one standard block 402. It should be noted that, in the present embodiment, the standard block 316 does not belong to the second target group corresponding to the prediction block 304, so the merge operation for generating the standard block 402 does not include merging the standard block 316.

It should be noted that, in the embodiment of FIG. 4, the image range covered by the standard block 401 (only) contains the original image ranges covered by the standard blocks 311 and 312. In addition, the image range covered by the standard block 402 (only) contains the original image ranges covered by the standard blocks 314 and 315. However, in another embodiment, the merging of the first standard block and the second standard block further includes merging part of the image area of the target image that does not belong to the first standard block and/or the second standard block.

Figure 5:
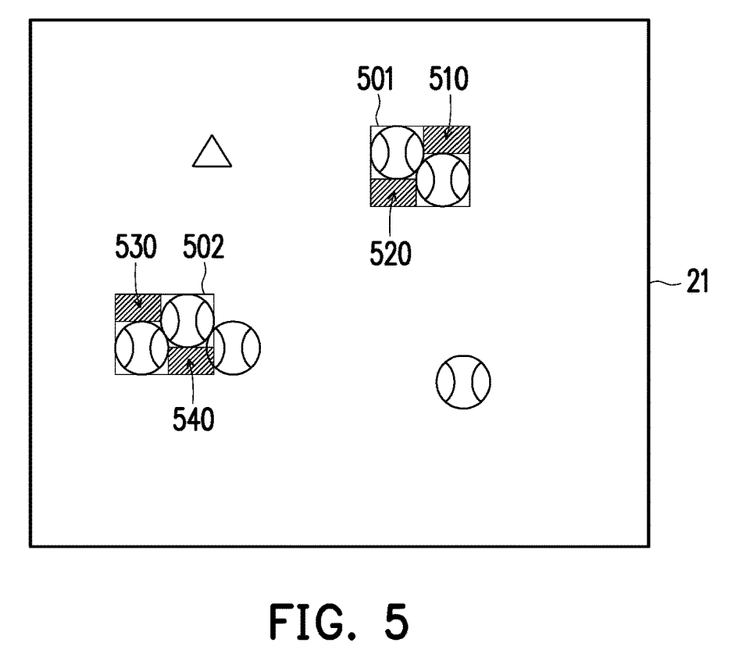
FIG. 5 is a schematic diagram of merging standard blocks according to an embodiment of the disclosure.

FIG. 5 is a schematic diagram of merging standard blocks according to an embodiment of the disclosure. Referring to FIG. 3 and FIG. 5, in an embodiment, in response to the standard blocks 311 and 312 both belonging to the first target group corresponding to the prediction block 301, the standard blocks 311 and 312 may be merged into one standard block 501, and areas 510 and 520 may also be merged as part of the standard block 501. The areas 510 and 520 are adjacent areas of at least one of the standard blocks 311 and 312. The areas 510 and 520 are not covered by the standard blocks 311 and 312. Moreover, in response to the standard blocks 314 and 315 both belonging to the second target group corresponding to the prediction block 304, the standard blocks 314 and 315 may be merged into one standard block 502, and the areas 530 and 540 may also be merged as part of the standard block 502. The areas 530 and 540 are adjacent areas of at least one of the standard blocks 314 and 315. The areas 530 and 540 are not covered by the standard blocks 314 and 315.

Figure 6:
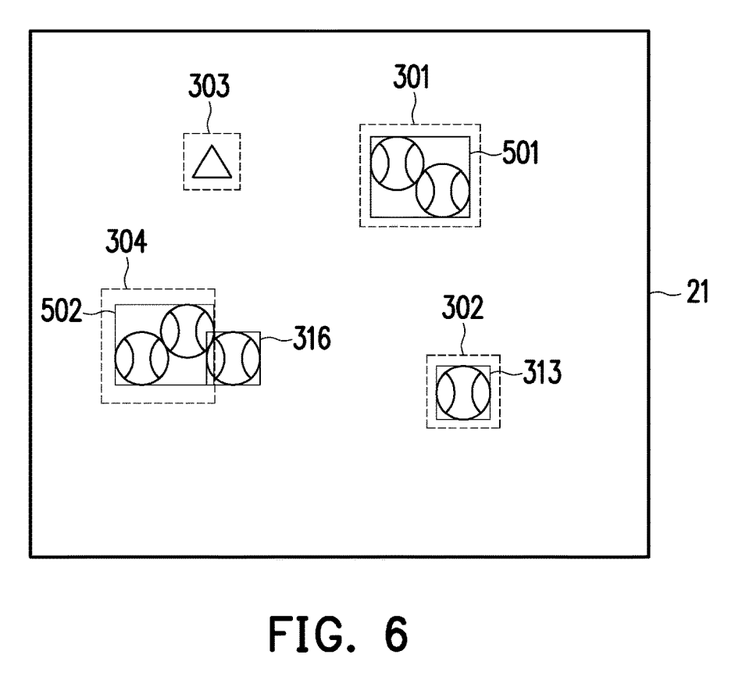
FIG. 6 is a schematic diagram of a standard block and a prediction block according to an embodiment of the disclosure.

FIG. 6 is a schematic diagram of a standard block and a prediction block according to an embodiment of the disclosure. It should be noted that, in the embodiment of FIG. 6, the standard blocks 501 and 502 of FIG. 5 are taken as examples of the merged standard blocks. However, in another embodiment of FIG. 6, the standard blocks 401 and 402 of FIG. 4 may also be used as an example of the merged standard blocks, which is not limited in the present disclosure.

Referring to FIG. 1, FIG. 2 and FIG. 6, the processor 13 may obtain evaluation information according to the standard blocks 501, 313, 316 and 502 and the prediction blocks 301-304. The evaluation information reflects a prediction efficiency of the machine vision for searching the objects 201-206 in the image 21. Taking the prediction block 301 as an example, the processor 13 may obtain a prediction state of the prediction block 301 according to an overlapping state between the standard block 501 and the prediction block 301. For example, the overlapping state may reflect an overlapping degree between an image range covered by the standard block 501 and an image range covered by the prediction block 301.

In an embodiment, the processor 13 may obtain an area (also referred to as a fifth area) of the intersection set area between the image range covered by the standard block 501 and the image range covered by the prediction block 301. In addition, the processor 13 may obtain an area (also referred to as a sixth area) of the union of sets area between the image range covered by the standard block 501 and the image range covered by the prediction block 301. In this embodiment, the area of the union set area is equal to the area of the prediction block 301. The processor 13 may divide the fifth area by the sixth area to obtain a value (also referred to as a third value). The processor 13 may determine whether the third value is greater than a preset value (also referred to as a second preset value). If the third value is greater than the second preset value, the processor 13 may determine that the objects 201 and 202 have been found by the machine vision. However, if the third value is not greater than the second preset value, the processor 13 may determine that the objects 201 and 202 are not found by the machine vision. In the present embodiment, the third value is greater than the second preset value, so the processor 13 may obtain a prediction state, corresponding to the prediction block 301, which reflects that the objects 201 and 202 have been found by the machine vision.

Taking the prediction block 302 as an example, the processor 13 may obtain an area (also referred to as a seventh area) of the intersection set area between an image range covered by the standard block 313 and an image range covered by the prediction block 302. In addition, the processor 13 may obtain an area (also referred to as an eighth area) of the union set area between the image range covered by the standard block 313 and the image range covered by the prediction block 302. The processor 13 may divide the seventh area by the eighth area to obtain a value (also referred to as a fourth value). The processor 13 may determine whether the fourth value is greater than the second preset value. In the present embodiment, the fourth value is greater than the second preset value, so the processor 13 may obtain a prediction state, corresponding to the prediction block 302, which reflects that the object 203 has been found by the machine vision.

Taking the prediction block 303 as an example, the prediction block 303 does not cover any standard block, so the processor 13 may obtain a prediction state, corresponding to the prediction block 303, which reflects that the prediction block 303 does not find any target object. In addition, taking the prediction block 304 as an example, the processor 13 may obtain a prediction state of the prediction block 304 according to an overlapping state between the standard block 502 and the prediction block 304. In this embodiment, the prediction state of the prediction block 304 reflects that the objects 204 and 205 have been found by the machine vision. Furthermore, the processor 13 may determine that the object 206 is not found by the machine vision based on an overlapping state between the standard block 316 and the prediction block 304. Based on the prediction states corresponding to the prediction blocks 301 to 304, the processor 13 may obtain the evaluation information reflecting the prediction efficiency of the machine vision for the objects 201 to 206 in the image 21.

Figure 7:
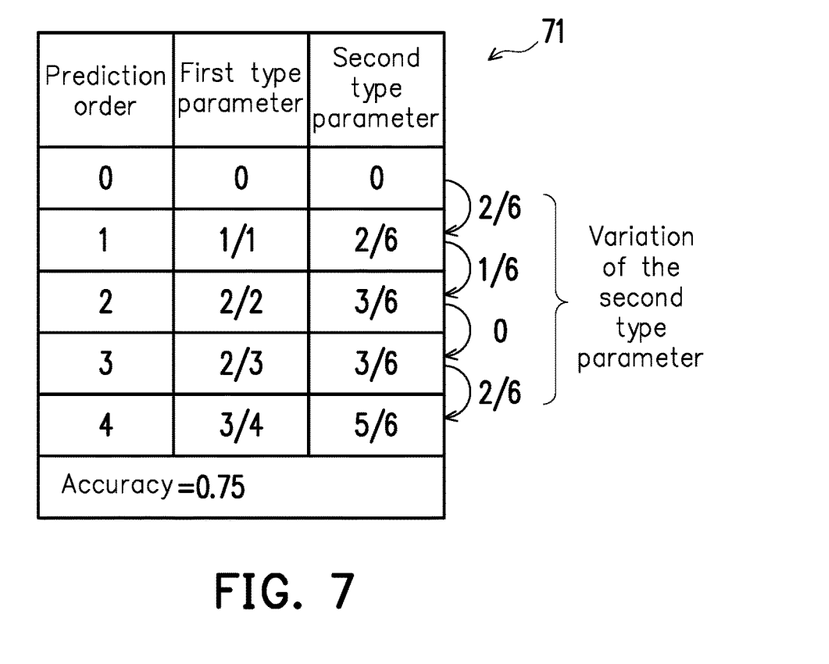
FIG. 7 is a schematic diagram of evaluation information according to an embodiment of the disclosure.

FIG. 7 is a schematic diagram of evaluation information according to an embodiment of the disclosure. Referring to FIG. 1 to FIG. 3, FIG. 6 and FIG. 7, the processor 13 may update a first type parameter and a second type parameter according to the prediction states corresponding to the prediction blocks 301-304 and the generation order of the prediction blocks 301-304 (i.e., the prediction order). The processor 13 may obtain evaluation information 71 based on the first type parameter and the second type parameter. In an embodiment, the first type parameter is also referred to as a precision parameter and/or the second type parameter is also referred to as a recall parameter.

In this embodiment, the prediction order 0 represents that a prediction block is not generated yet, and the prediction orders 1 to 4 respectively represent that the prediction blocks 301-304 are generated in sequential by the image recognition of the machine vision. Corresponding to the prediction order 0, no prediction block is generated, so the first type parameter and the second type parameter are both initial values (for example, 0).

Corresponding to the prediction order 1, the prediction block 301 is generated. According to the prediction state of the prediction block 301, the objects 201 and 202 are found. Therefore, the processor 13 may update the first type parameter to 1/1 according to the total number of the standard block 501 corresponding to the found objects 201 and 202 (for example, 1) and the total number of the prediction block 301 (for example, 1) that have been generated. In addition, the processor 13 may update the second type parameter to 2/6 according to the total number of the original standard blocks 311 and 312 corresponding to the found objects 201 and 202 (for example, 2) and the total number of the original standard blocks 311-316 (for example, 6). That is, corresponding to the prediction orders 0 to 1, the variation of the second type parameter is 2/6.

Corresponding to the prediction order 2, the prediction block 302 is generated. According to the prediction state of the prediction block 302, the object 203 is found. Therefore, the processor 13 may update the first type parameter to 2/2 according to the total number of the standard blocks 501 and 313 corresponding to the found objects 201-203 (for example, 2) and the total number of the prediction blocks 301 and 302 (for example, 2) that have been generated. In addition, the processor 13 may update the second type parameter to 3/6 according to the total number of the original standard blocks 311-313 corresponding to the found objects 201 to 203 (for example, 3) and the total number of the original standard blocks 311-316 (for example, 6). That is, corresponding to the prediction orders 1 to 2, the variation of the second type parameter is 1/6.

Corresponding to the prediction order 3, the prediction block 303 is generated. According to the prediction state of the prediction block 303, no target object is found. Therefore, the processor 13 may update the first type parameter to 2/3 according to the total number of the standard blocks 501 and 313 corresponding to the found objects 201 to 203 (for example, 2) and the total number of the prediction blocks 301 to 303 (for example, 3) that have been generated. In addition, the processor 13 may maintain the second type parameter at 3/6. That is, corresponding to the prediction orders 2 to 3, the variation of the second type parameter is zero.

Corresponding to the prediction order 4, the prediction block 304 is generated. According to the prediction state of the prediction block 304, the objects 204 and 205 are found. Therefore, the processor 13 may update the first type parameter to 3/4 according to the total number of the standard blocks 501, 313, and 502 corresponding to the found objects 201-205 (for example, 3) and the total number of the prediction blocks 301-304 (for example, 4) that have been generated. In addition, the processor 13 may update the second type parameter to 5/6 according to the total number of the original standard blocks 311-315 corresponding to the found objects 201-205 (for example, 5) and the total number of the original standard blocks 311-316 (for example, 6). That is, corresponding to the prediction orders 3 to 4, the variation of the second type parameter is 2/6.

The processor 13 may multiplies each variation of the second type parameter by the corresponding first type parameter and then obtain the evaluation information 71 according to the sum of the multiplied results. For example, the processor 13 may obtain that accuracy information AP is 0.75 according to the following equation (1). The accuracy information AP may reflect an accuracy (or a prediction efficiency) for identifying the objects 201-206 including the grouping objects (and non-grouping objects) by the image recognize module 12 being about 75%.

$$AP = \left(\frac{1}{1} \times \frac{2}{6}\right) + \left(\frac{2}{2} \times \frac{1}{6}\right) + \left(\frac{2}{3} \times 0\right) + \left(\frac{3}{4} \times \frac{2}{6}\right) = 0.75 \quad (1)$$

Relative to a calculation method without considering the grouping effect in tradition and the OpenImage algorithm proposed by Google, the accuracy information AP of the evaluation information 71 (for example, 0.75) may more accurately reflects the accuracy for identifying the grouping objects and the non-grouping objects in the same image. In an embodiment, the evaluation information 71 can be used to maintain or modify the image recognition algorithm and/or the artificial intelligence module employed by the image recognize module 12.

Figure 8:
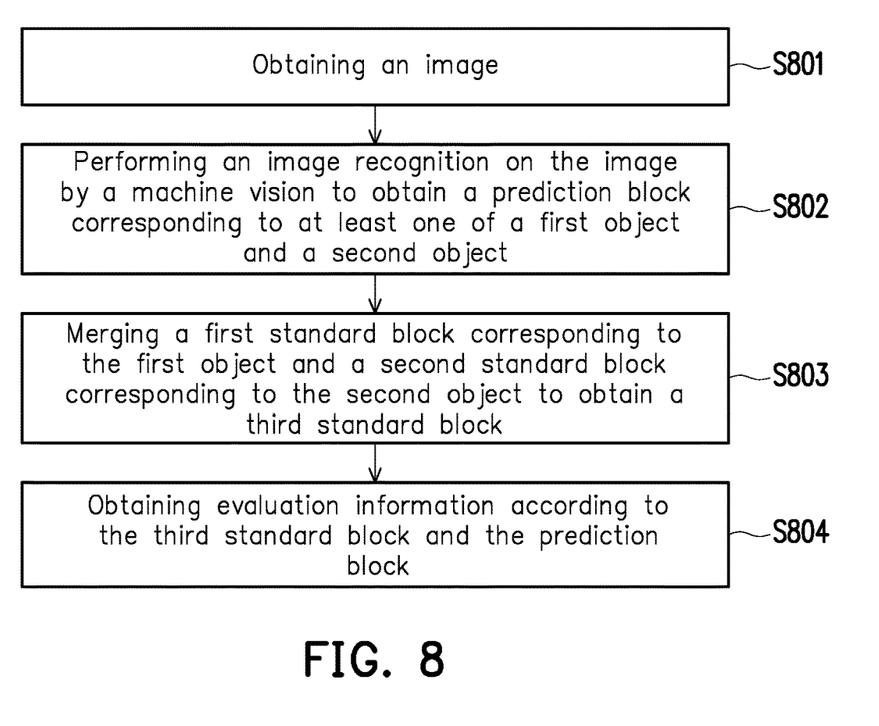
FIG. 8 is a flow chart of a method for evaluating an efficiency of a machine vision according to an embodiment of the disclosure.

FIG. 8 is a flow chart of a method for evaluating an efficiency of a machine vision according to an embodiment of the disclosure. Referring to FIG. 8, in step S801, an image is obtained. The image presents a plurality of objects (i.e., the target objects) and the objects include a first object and a second object. In step S802, an image recognition is performed on the image by a machine vision to obtain a prediction block corresponding to at least one of the first object and the second object. In step S803, a first standard block corresponding to the first object and a second standard block corresponding to the second object are merged (i.e., combined) to obtain a third standard block. In step S804, evaluation information is obtained according to the third standard block and the prediction block. The evaluation information reflects a prediction efficiency of the machine vision for the target object in the image.

In summary, after obtaining an image including a plurality of target objects, an image recognition may be performed on the image by a machine vision to obtain a prediction block corresponding to at least one of the first object and the second object. Then, a first standard block corresponding to the first object and a second standard block corresponding to the second object may be combined to obtain a third standard block. According to the third standard block and the prediction block, the evaluation information can be obtained. The evaluation information reflects the prediction efficiency of the machine vision for the objects in the image. Thereby, the defect that the traditional recognition of machine vision for grouping objects cannot be effectively scored may be effectively improved. In addition, the evaluation information can be used to maintain or modify the image recognition algorithm and/or artificial intelligence module used by the image recognize module, and further improves an image recognition technology and/or an image recognition device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for evaluating an efficiency of a machine vision, comprising:
    obtaining an image, wherein the image presents a plurality of objects and the plurality of objects comprises a first object and a second object;
    performing an image recognition on the image by the machine vision to obtain a prediction block corresponding to at least one of the first object and the second object;
    merging a first standard block corresponding to the first object and a second standard block corresponding to the second object to obtain a third standard block; and
    obtaining evaluation information according to the third standard block and the prediction block, wherein the evaluation information reflects a prediction efficiency of the machine vision for the objects in the image.

2. The method according to claim 1, wherein a shortest distance gap between the first object and the second object in the image is less than a distance threshold value.

3. The method according to claim 1, wherein the step of merging the first standard block corresponding to the first object and the second standard block corresponding to the second object to obtain the third standard block comprises:
    determining whether the first standard block belongs to a target group;
    determining whether the second standard block belongs to the target group; and
    merging the first standard block with the second standard block to obtain the third standard block in response to that the first standard block and the second standard block both belong to the target group.

4. The method according to claim 3, wherein the step of determining whether the first standard block belongs to the target group comprises:

determining that the first standard block belongs to the target group according to an overlapping state between the first standard block and the prediction block.

5. The method according to claim 1, wherein the step of merging the first standard block corresponding to the first object and the second standard block corresponding to the second object to obtain the third standard block comprises:

merging a part of region not belonging to the first standard block and the second standard block into a part of the third standard block.

6. The method according to claim 1, wherein the step of obtaining the evaluation information according to the third standard block and the prediction block comprises:

obtaining a prediction state of the prediction block according to an overlapping state between the third standard block and the prediction block, wherein the prediction state reflects that the first object and the second object are both found by the machine vision; and obtaining the evaluation information according to the prediction state.

7. The method according to claim 6, wherein the step of obtaining the evaluation information according to the prediction state comprises:

updating a first type parameter and a second type parameter according to the prediction state and a generation order of the prediction block; and obtaining the evaluation information according to the first type parameter and the second type parameter.

8. The method according to claim 1, further comprising:

updating the first type parameter according to a total number of the prediction block; and updating the second type parameter according to a total number of the first standard block and the second standard block.

9. A system for evaluating an efficiency of a machine vision, comprising:

a storage device which stores an image, wherein the image presents a plurality of objects and the plurality of objects includes a first object and a second object;

an image recognize module; and a processor, coupled to the storage device and the image recognize module, wherein the image recognize module performs an image recognition on the image by the machine vision to obtain a prediction block corresponding to at least one of the first object and the second object, the processor merges a first standard block corresponding to the first object and a second standard block corresponding to the second object to obtain a third standard block, and the processor obtains evaluation information according to the prediction block and the third standard block, wherein the evaluation information reflects a prediction efficiency of the machine vision for the objects in the image.

10. The system according to claim 9, wherein a shortest distance gap between the first object and the second object in the image is less than a distance threshold value.

11. The system according to claim 9, wherein the operation of merging the first standard block corresponding to the first object and the second standard block corresponding to the second object to obtain the third standard block comprises:

determining whether the first standard block belongs to a target group;

determining whether the second standard block belongs to the target group; and merging the first standard block with the second standard block to obtain the third standard block in response to that the first standard block and the second standard block both belong to the target group.

12. The system according to claim 11, wherein the operation of determining whether the first standard block belongs to the target group comprises:

determining that the first standard block belongs to the target group according to an overlapping state between the first standard block and the prediction block.

13. The system according to claim 9, wherein the operation of merging the first standard block corresponding to the first object and the second standard block corresponding to the second object to obtain the third standard block comprises:

merging a part of region not belonging to the first standard block and the second standard block into a part of the third standard block.

14. The system according to claim 9, wherein the operation of obtaining the evaluation information according to the third standard block and the prediction block comprises:

obtaining a prediction state of the prediction block according to an overlapping state between the third standard block and the prediction block, wherein the prediction state reflects that the first object and the second object are both found by the machine vision; and obtaining the evaluation information according to the prediction state.

15. The system according to claim 14, wherein the operation of obtaining the evaluation information according to the prediction state comprises:

updating a first type parameter and a second type parameter according to the prediction state and a generation order of the prediction block; and obtaining the evaluation information according to the first type parameter and the second type parameter.

16. The system according to claim 15, wherein the processor updates the first type parameter according to a total number of the prediction block, and the processor updates the second type parameter according to a total number of the first standard block and the second standard block.

* * * * *